(12) United States Patent
Tobe et al.

(10) Patent No.: US 7,773,989 B2
(45) Date of Patent: Aug. 10, 2010

(54) WIRELESS COMMUNICATION APPARATUS AND WIRELESS COMMUNICATION METHOD

(75) Inventors: Akiko Tobe, Yokosuka (JP); Masayuki Tsuda, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 473 days.

(21) Appl. No.: 11/875,132

(22) Filed: Oct. 19, 2007

(65) Prior Publication Data

US 2008/0096485 A1      Apr. 24, 2008

(30) Foreign Application Priority Data

Oct. 20, 2006    (JP) .......................... P2006-286586

(51) Int. Cl.
*H04W 4/00* (2009.01)

(52) U.S. Cl. ................ 455/435.2; 455/41.2; 455/412.2; 455/414.1; 370/328

(58) Field of Classification Search ............. 455/435.2, 455/41.2, 412.2, 440, 443, 422.1, 414.1, 455/456, 436; 370/328
See application file for complete search history.

(56) References Cited

U.S. PATENT DOCUMENTS

| | | | | |
|---|---|---|---|---|
| 5,548,819 | A * | 8/1996 | Robb ........................ | 455/59 |
| 5,630,060 | A * | 5/1997 | Tang et al. ................ | 709/238 |
| 6,366,840 | B1 * | 4/2002 | Buckley .................... | 701/36 |
| 6,577,849 | B1 * | 6/2003 | Eaton et al. ............... | 455/3.01 |
| 6,765,474 | B2 * | 7/2004 | Eaton et al. ............... | 340/7.43 |
| 6,850,285 | B2 * | 2/2005 | Eaton et al. ............... | 348/563 |
| 7,054,634 | B2 * | 5/2006 | Watanabe et al. .......... | 455/440 |
| 7,127,261 | B2 * | 10/2006 | Van Erlach ............... | 455/456.5 |
| 7,636,407 | B2 * | 12/2009 | Maeda et al. .............. | 375/349 |
| 2003/0165128 | A1 * | 9/2003 | Sisodia et al. ............. | 370/338 |
| 2005/0239443 | A1 * | 10/2005 | Watanabe et al. ......... | 455/414.1 |
| 2006/0050670 | A1 | 3/2006 | Hillyard et al. | |
| 2006/0067446 | A1 * | 3/2006 | Maeda et al. .............. | 375/349 |
| 2006/0072525 | A1 | 4/2006 | Hillyard et al. | |
| 2006/0259651 | A1 * | 11/2006 | Liu ........................... | 710/8 |
| 2008/0125067 | A1 * | 5/2008 | Bells et al. ................ | 455/187.1 |
| 2009/0157799 | A1 * | 6/2009 | Sukumaran et al. ........ | 709/203 |

(Continued)

FOREIGN PATENT DOCUMENTS

EP    1 255 383   A2    11/2002

(Continued)

*Primary Examiner*—Minh D Dao
(74) *Attorney, Agent, or Firm*—Oblon, Spivak, McClelland, Maier & Neustadt, L.L.P.

(57) ABSTRACT

When a native application and a downloaded application installed on a mobile equipment are simultaneously executed by multitask and when these applications try to use short-range wireless communication simultaneously, the short-range wireless communication may be unavailable because of restrictions on communication resources. An object of the invention is to provide a wireless communication apparatus and wireless communication method capable of performing communication management to permit the applications to use the short-range wireless communication, without a need for a complicated operation of especially terminating an application to release a communication resource in the foregoing case. A communication profile storage 105 stores combinations of communication profiles which can be simultaneously executed. A short-range wireless communication management unit 104 determines whether a communication process according to an instruction from an external application 102 can be executed, based on the communication profiles. When the short-range wireless communication process is determined not to be executed, a disconnection unit 108 notifies the external application 102 of unavailability of the communication.

13 Claims, 7 Drawing Sheets

U.S. PATENT DOCUMENTS

2010/0049879 A1* 2/2010 Leavitt et al. ................ 710/14

FOREIGN PATENT DOCUMENTS

| JP | 2004-157851 | 6/2004 |
| JP | 2006-81220 | 3/2006 |
| JP | 2006-121624 | 5/2006 |
| WO | WO 2006/053951 A1 | 5/2006 |

* cited by examiner

*Fig.4*

| PROFILE | 1 | 2 |
|---|---|---|
| MUSIC APPLICATION | ○ | ○ |
| DATA COMMUNICATION APPLICATION | | ○ |
| HANDS-FREE APPLICATION | ○ | |

WIRELESS COMMUNICATION APPARATUS AND WIRELESS COMMUNICATION METHOD

BACKGROUND OF THE INVENTION

1. Field of the Invention

The present invention relates to a wireless communication apparatus and wireless communication method for performing short-range wireless communication.

2. Related Background Art

The recent mobile equipment is able to perform communication using the short-range wireless communication such as Bluetooth. For example, as described in Patent Document 1, it is known that the mobile equipment is connected for communication with a headphone or the like by Bluetooth to enable a hands-free telephone call.

[Patent Document 1] Japanese Patent Application Laid-Open No. 2006-81220

SUMMARY OF THE INVENTION

The multitasking feature has been developed for the recent mobile equipment and, for example, it can be considered that multiple tasks are simultaneously carried out to implement Bluetooth communication by a native application preinstalled on the mobile equipment before shipment of the mobile equipment and Bluetooth communication by a downloaded application such as i-Appli®.

Since Bluetooth communication resources (a frequency band, a memory in the mobile equipment for communication, etc.) are limited, there are, however, cases where different types of short-range wireless communication cannot be simultaneously executed. In such cases, it can be contemplated that priority is given to communication by an application having established an earlier communication connection, but many downloaded applications such as i-Appli are often created based on the assumption that the Bluetooth communication is available, which results in posing a problem that a state managed by an application is different from an actual state. For this reason, a downloaded application such as i-Appli can or cannot operate as programmed, depending upon states of communication resources. In this case, the downloaded application is hard to use and also hard to create. Furthermore, whether the Bluetooth communication is available or not is not determined unless the downloaded application such as i-Appli is activated. Therefore, when the Bluetooth communication is found to be unavailable after activation of the downloaded application, a complicated operation is required as follows; for example, the application is once terminated to disconnect the Bluetooth communication, and then the downloaded application is activated again.

The difference in state management can occur, for example, in a case where an application is activated by an instruction from an external network to execute the Bluetooth communication. In this case, the application operates to perform the Bluetooth communication and manages its operation state, but there are practical cases where communication is unavailable because of a lack in the communication resources for the Bluetooth communication. In this case, while the external network sends the request for communication by the activation instruction to the application, the application fails to perform the communication and this results in failure in desired data acquisition or processing. Therefore, there is the problem that the external network side is unable to manage the state of the application correctly.

On the other hand, it can also be contemplated that when activation of an application is instructed by an instruction from the external network, priority is given to the Bluetooth communication by the application. In that case, however, communication by a native application having established an earlier communication connection will be disconnected. For example, when a user is in use of hands-free communication by Bluetooth, there occurs an event that the hands-free communication is suddenly interrupted. Therefore, a problem will arise if communication is disconnected by the instruction from the external network.

In order to solve the above-described problems, an object of the present invention is therefore to provide a wireless communication apparatus and wireless communication method capable of performing communication management without inconsistency between a communication state managed by an application and an actual state, even in a case where communication by the application is unavailable.

In order to solve the aforementioned problems, a wireless communication apparatus of the present invention comprises a plurality of applications; wireless communication unit for performing short-range wireless communication, based on instructions from the applications; storage unit for storing a table in which combinations of communication profiles allowing simultaneous communication for each of the applications are described, and a current use state of execution of the short-range wireless communication; determining unit for, with an instruction from one application, determining whether the short-range wireless communication is available for the one application, based on the combinations of communication profiles described in the table stored in the storage unit and the current use state of the short-range wireless communication; and notifying unit for notifying the one application that the short-range wireless communication is unavailable, when the determining unit determines that the short-range wireless communication is not available for the one application.

A wireless communication method of the present invention is a wireless communication method of a wireless communication apparatus capable of executing a plurality of applications, the wireless communication method comprising: a wireless communication step of performing short-range wireless communication, based on instructions from the applications; a determination step of, with an instruction from one application, determining whether the short-range wireless communication is available for the one application, based on combinations of communication profiles allowing simultaneous use for each of the applications, which are preliminarily stored in a table, and a current use state of the short-range wireless communication; and a notification step of notifying the one application that the short-range wireless communication is unavailable, when it is determined in the determination step that the short-range wireless communication is not available for the one application.

This configuration permits the following operation: when one application gives an instruction such as a connection or confirmation of short-range wireless communication, based on the combinations of communication profiles for a plurality of applications to simultaneously execute the short-range wireless communication, and the current use state of short-range wireless communication, whether the short-range wireless communication by the one application is available can be determined based on the available combinations of communication profiles held in mobile equipment. When it is determined that the short-range wireless communication by the one application is not available, the one application is notified that the short-range wireless communication is unavailable.

This can avoid a situation in which one application fails to establish a connection of short-range wireless communication in spite of an instruction of the connection of short-range wireless communication, and can also avoid inconsistency between the state instructed by the application and the actual state, which can improve convenience of the downloaded application such as i-Appli and ease of programming attendant on the state management. The same processing is also performed in a confirmation process to confirm the availability of a connection, whereby in an unavailable case of the connection the fact can be notified of.

The wireless communication apparatus of the present invention is preferably configured as follows: the storage unit stores a total number of communication connections by the short-range wireless communication, as a communication profile, and the determining unit determines whether the short-range wireless communication is available for the one application, based on the number of connections by the wireless communication.

This configuration permits whether the short-range wireless communication is available for one application, to be determined based on the number of connections by the wireless communication. The communication management can also be performed not only based on the communication profiles such as wireless communication resources, but also based on the number of connections. This can prevent a failure in operation of an application due to increase in the number of connections, and can avoid the inconsistency between the state instructed by the application and the actual state more reliably.

The wireless communication apparatus of the present invention is preferably configured as follows: the one application receives an instruction of activation through a network.

The wireless communication apparatus of the present invention is preferably configured as follows: when any communication connection by the short-range wireless communication is not available, a notification of unavailability of connection is sent to the network.

These configurations permit the following operation: when one application receives an instruction of activation through the network and when any communication connection by the short-range wireless communication is not available, the notification of the unavailability of connection is sent to the network. This permits the network to be also notified of the communication state of the short-range wireless communication of the one application, and can avoid the inconsistency between the state instructed by the network side and the actual state.

The wireless communication apparatus of the present invention is preferably configured so as to further comprise informing unit for informing a user that the short-range wireless communication by an application currently in the short-range wireless communication should be disconnected.

This configuration permits the user to be informed that the short-range wireless communication by the application currently in the short-range wireless communication should be disconnected, whereby the short-range wireless communication can be disconnected based on a user's permission.

The wireless communication apparatus of the present invention is preferably configured to further comprise display unit for displaying applications under connection in accordance with a disconnection request; and disconnecting unit for disconnecting a connection of an application selected from the applications displayed by the display unit.

This configuration permits the following operation: applications under connection are displayed according to a disconnection request and a connection of an application selected among the displayed applications is disconnected, whereby the short-range wireless communication connection due to a malfunction or the like can be disconnected. Since the user is allowed to select the disconnection, the user is made conscious of the status of utilization of the short-range wireless communication. Furthermore, this configuration makes it easier to restart the disconnected short-range wireless communication by an application after completion of wireless communication by one application, and can improve the convenience of wireless communication by applications.

The wireless communication apparatus of the present invention further comprises connection switch unit for executing a wireless communication connection by the short-range wireless communication unit in another application different from the one application, after disconnection by the disconnecting unit.

This configuration permits the apparatus to execute the wireless communication connection in another application different from the one application, and to implement the function of the one application substantially, and can provide the wireless communication function easier for the user to use.

The wireless communication apparatus of the present invention is preferably configured as follows: the one application sends to the determining unit an inquiry about whether the short-range wireless communication is available, using an application programming interface, and with the inquiry, the determining unit determines whether the short-range wireless communication by the one application is available.

This configuration permits one application to make the inquiry about the availability of short-range wireless communication, using the API (Application Programming Interface), and can facilitate control of connection by the short-range wireless communication.

The wireless communication apparatus of the present invention is preferably configured as follows: when the user selects a disconnection, the one application gives an instruction to instruct the disconnecting unit to perform the disconnection, using an application programming interface, and with the instruction, the disconnecting unit disconnects the connection based on the short-range wireless communication by the one application.

This configuration permits one application to disconnect the short-range wireless communication, using the API (Application Programming Interface), and can facilitate control of disconnection by the short-range wireless communication.

Another wireless communication apparatus of the present invention is a wireless communication apparatus comprising: a plurality of applications; wireless communication unit for performing short-range wireless communication, based on instructions from the applications; storage unit for storing a table in which combinations of communication profiles allowing simultaneous communication for each of the applications are described, and a current use state of execution of the short-range wireless communication; and determining unit for, with an instruction from one application, determining whether the short-range wireless communication is available for the one application, based on the combinations of communication profiles described in the table stored in the storage unit and the current use state of the short-range wireless communication; wherein the storage unit stores application correlation information to indicate a correlation between one application and an application functionally similar to the one application, and wherein when the determining unit determines that the short-range wireless communication is unavailable for the one application, the application functionally similar to the one application is activated using the application correlation information stored in the storage unit.

The wireless communication apparatus of the present invention is preferably configured as follows: the disconnecting unit does not execute a disconnection of the short-range wireless communication by an application for which a setting to inhibit the disconnection of wireless communication during the communication is preliminarily configured.

The wireless communication apparatus of the present invention is preferably configured as follows: the display unit does not display an application for which a setting to inhibit a disconnection of wireless communication during the communication is preliminarily configured.

The present invention successfully avoids the situation in which one application fails to establish a connection of short-range wireless communication in spite of an instruction of the connection of short-range wireless communication and also avoids the inconsistency between the state instructed by the application and the actual state.

BRIEF DESCRIPTION OF THE DRAWINGS

FIG. 4 is a drawing showing an example of communication profiles.

DESCRIPTION OF THE PREFERRED EMBODIMENTS

The present invention can be readily understood in view of the following detailed description with reference to the accompanying drawings presented for an embodiment. Subsequently, the embodiment of the present invention will be described with reference to the accompanying drawings. The same portions will be denoted by the same reference symbols as much as possible, without redundant description.

Figure 1:
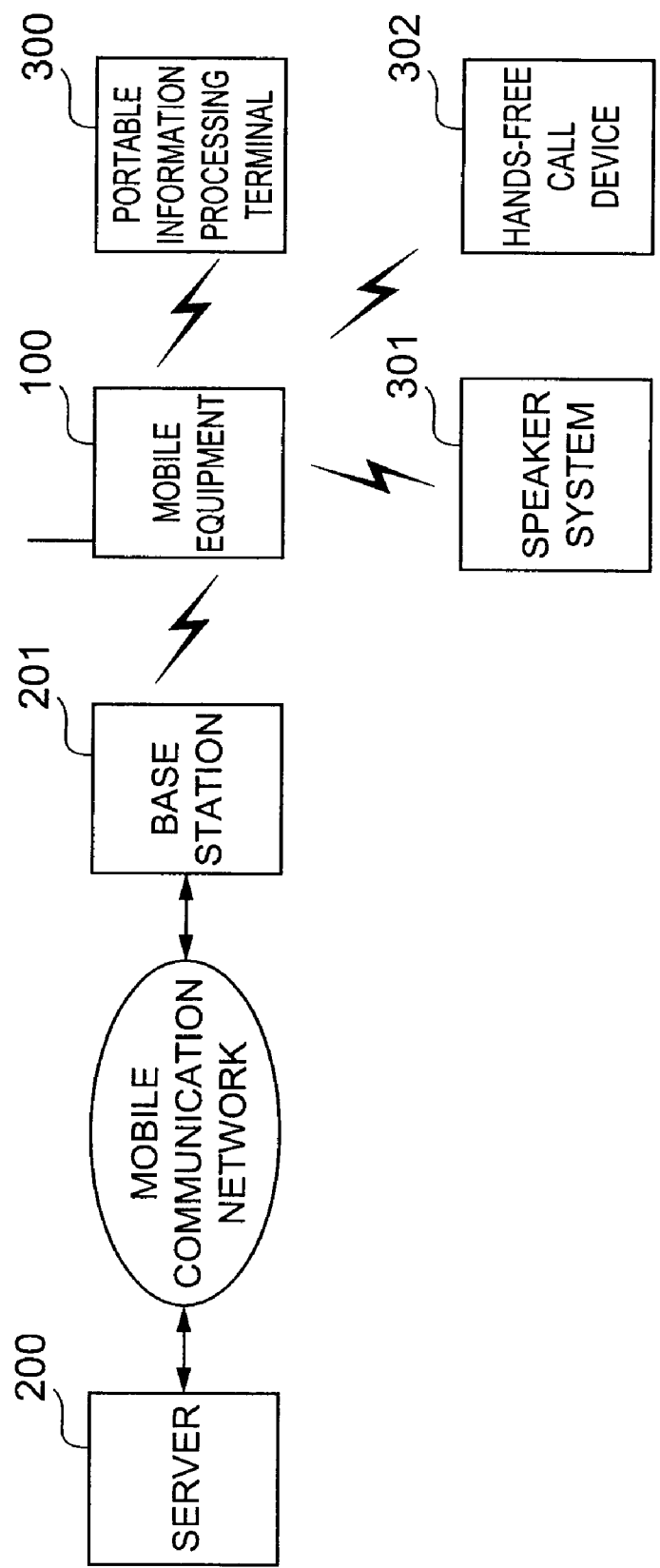
FIG. 1 is a system configuration diagram of a communication system using mobile equipment 100 of an embodiment of the present invention.

FIG. 1 is a system configuration diagram of a communication system using mobile equipment 100 of the present embodiment. The mobile equipment 100 is connected through base station 201 to a mobile communication network. The mobile equipment 100 can communicate with server 200 via this mobile communication network and this server 200 can acquire information of portable information processing terminal 300 through mobile equipment 100 in such a manner that the mobile equipment 100 communicates with the portable information processing terminal 300, using short-range wireless communication, e.g., Bluetooth.

The portable information processing terminal 300 of the present embodiment is, for example, an information processing terminal for delivery management used by a delivery company, and the server 200 can acquire a delivery record stored in this portable information processing terminal 300 by accessing the portable information processing terminal 300. When the server 200 establishes a communication connection to the mobile equipment 100 and accesses the mobile equipment 100, the mobile equipment 100 activates an application for delivery management installed inside. Then this application establishes a communication connection to the portable information processing terminal 300 by short-range wireless communication to acquire the delivery record and can transmit the acquired delivery record to the server 200.

The mobile equipment 100 can use the short-range wireless communication to communicate with speaker system 301 for listening to music and with hands-free call device 302 for hands-free telephone call.

The mobile equipment 100 can wirelessly communicate with portable information processing terminal 300, speaker system 301, and hands-free call device 302 by the short-range wireless communication, but simultaneously connectable terminals are limited in order to avoid duplication of frequencies by wireless communication. The following will describe the control about simultaneous connections.

Figure 2:
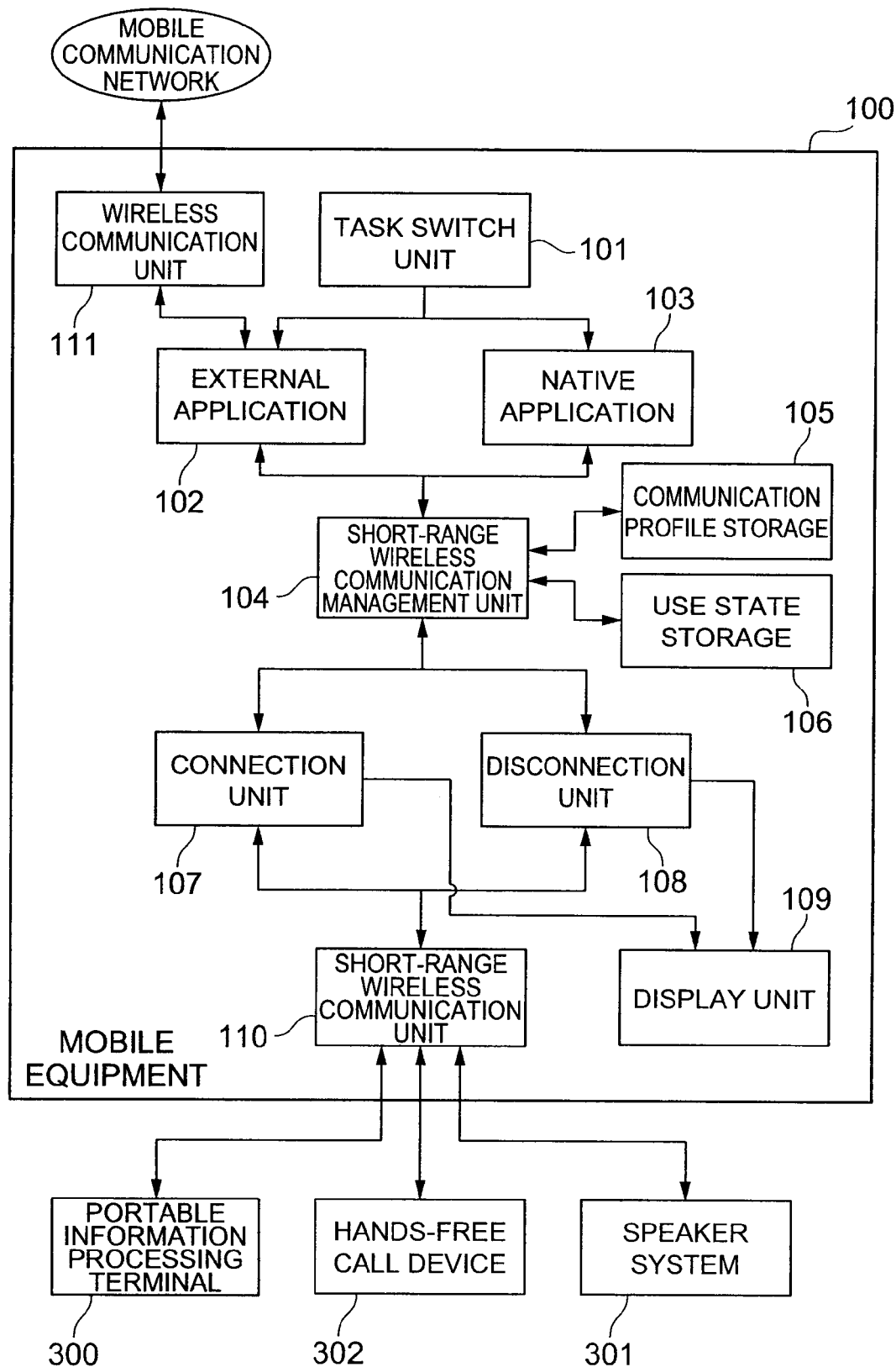
FIG. 2 is a block diagram of mobile equipment 100 of the embodiment.

FIG. 2 is a block diagram of mobile equipment 100 of the present embodiment. This mobile equipment 100 has task switch unit 101, external application 102, native application 103, short-range wireless communication management unit 104 (determining unit), communication profile storage 105 (storage unit), use state storage 106 (storage unit and connection switch unit), connection unit 107, disconnection unit 108 (notifying unit and disconnecting unit), display unit 109 (informing unit and display unit), short-range wireless communication unit 110 (wireless communication unit), and wireless communication unit 111.

Figure 3:
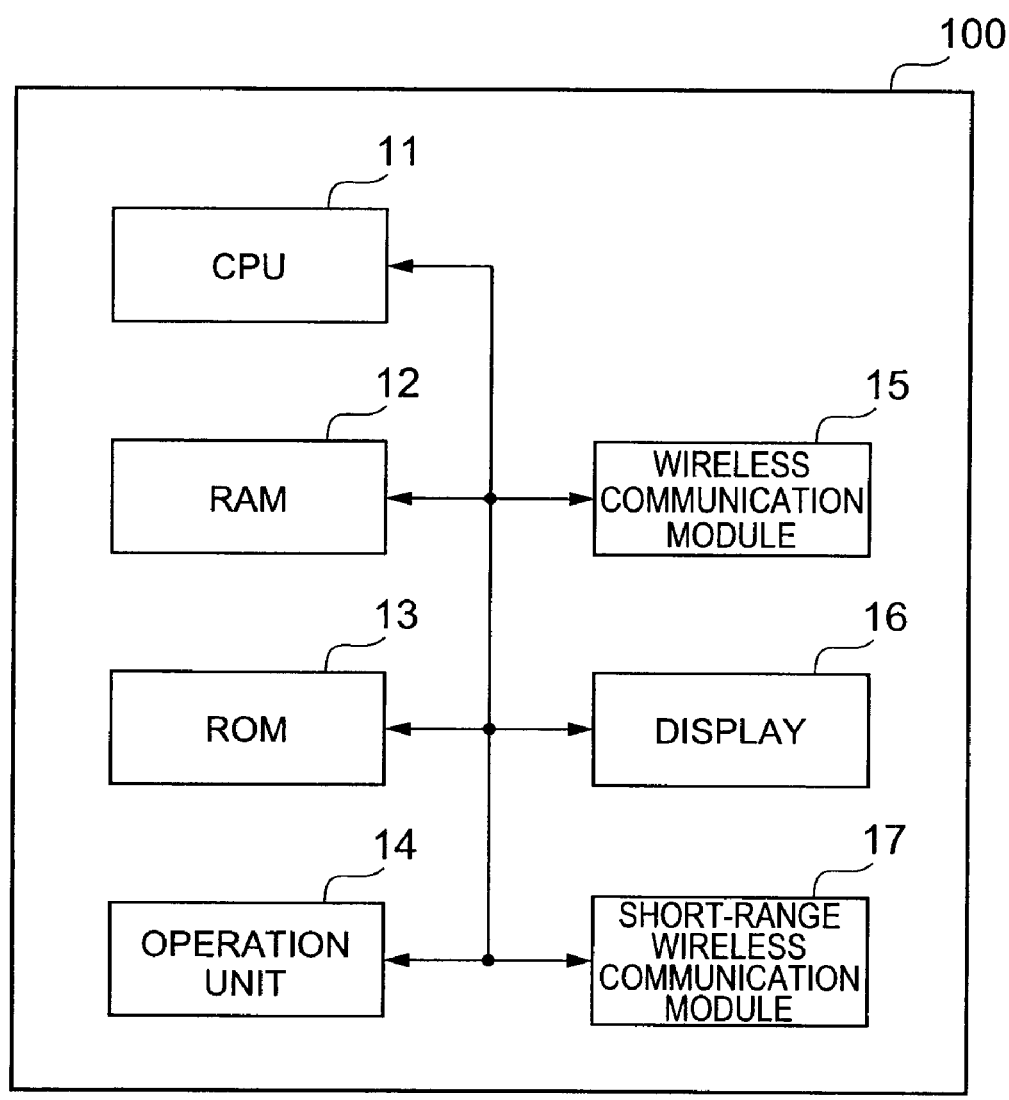
FIG. 3 is a hardware configuration diagram of mobile equipment 100.

The functions of this mobile equipment 100 can be implemented by the hardware shown in FIG. 3. FIG. 3 is a hardware configuration diagram of mobile equipment 100. The mobile equipment 100 is physically constructed as a cell phone incorporating CPU 11, RAM 12 and ROM 13 being main storage devices, operation unit 14 such as a keyboard and a mouse being input devices, wireless communication module 15, display 16, short-range wireless communication module 17, and so on, as shown in FIG. 3. Each of the functions described with FIG. 2 is implemented by retrieving a predetermined computer software onto the hardware such as the CPU 11, RAM 12, etc. shown in FIG. 3, operating the wireless communication module 15, operation unit 14, display 16, and short-range wireless communication module 17 under control of CPU 11, and reading or writing data from or into RAM 12. Each of functional blocks will be described below on the basis of the functional blocks shown in FIG. 2.

The task switch unit 101 is a part that performs a control to effect a switch between external application 102 and native application 103, based on a user's operation. The mobile equipment 100 of the present embodiment can activate a plurality of applications simultaneously by multitask control, and which application should be made active can be realized according to the switch control by the task switch unit 101.

The external application 102 is an application downloaded and installed through the wireless communication unit 111 from an external site in accordance with an operation by the user of mobile equipment 100, and is a so-called i-Appli®. An example of this external application 102 is a delivery record management application to be used by a delivery company. This delivery record management application is activated based on an instruction from server 200 and accesses the portable information processing terminal 300. Then the application acquires a delivery record stored in the portable information processing terminal 300 and returns the delivery record through the wireless communication unit 111 to server 200. This external application 102 does not have to be limited to the delivery record management application, but various types of applications may be installed as external application 102.

The native application 103 is an application preliminarily installed in the mobile equipment 100. For example, it can be a music application for a music player, or a hands-free application for hands-free telephone call; the native application 103 is activated by a user's operation and thereafter outputs music information designated by the user, to speaker system 301, or outputs call voice to hands-free call device 302, thereby implementing reproduction in each device. This native application 103 does not have to be limited to the music application or the hands-free application, but a plurality of applications may be installed as native application 103.

The short-range wireless communication management unit 104 is a part that instructs the connection unit 107 or the disconnection unit 108 to perform a connection process or a disconnection process, for the short-range wireless communication unit 110 to execute short-range wireless communication, or to perform disconnection of the communication, in accordance with an instruction from the external application 102 or the native application 103.

The short-range wireless communication management unit 104 is also a part that determines applications that can be simultaneously activated, based on combinations of communication profiles stored in communication profile storage 105 and use state information stored in use state storage 106. The short-range wireless communication management unit 104 can determine the availability of connection of short-range wireless communication for an application at a new connection instruction, based on the determination.

For example, when an application for which no wireless resource is available, e.g., an application in duplication of a radio frequency band is to be activated, the short-range wireless communication unit 110 cannot perform the short-range wireless communication by the application at the same time, and thus the short-range wireless communication management unit 104 outputs an instruction to instruct the disconnection unit 108 to disconnect the short-range wireless communication by an application currently under connection. When the total number of communication connections exceeds a maximum number of communication connections, the short-range wireless communication management unit 104 also outputs the same instruction to instruct the disconnection unit 108 to disconnect the short-range wireless communication by the application currently under connection.

The short-range wireless communication management unit 104 can also perform the following control: when it determines that the wireless communication by the external application 102 cannot be performed, and instructs the disconnection unit 108 to perform the disconnection, an application or native application functionally similar to the external application 102 is activated to execute wireless communication. For performing this control, it is necessary to make the communication profile storage 105 or another storage store information indicating the correlation between the external application 102 and the application functionally similar to this external application 102, and specify the application to be activated instead when the wireless communication by external application 102 cannot be performed. The application to be activated instead must be an application free of duplication of wireless communication resources.

The short-range wireless communication management unit 104 is preferably installed as an API (Application Programming Interface) in the mobile equipment 100. This short-range wireless communication management unit 104 performs an inquiry process about availability of short-range wireless communication in response to an inquiry from external application 102 and notifies the external application 102 of the result thereof.

The communication profile storage 105 is a part that stores combinations of simultaneously usable communication profiles. For example, as shown in FIG. 4, the communication profile storage 105 stores a table of combinations of communication profiles that can be simultaneously activated; for example, combination 1 indicates that it is possible to simultaneously use an audio communication profile used by a music application and a hands-free communication profile used by a hands-free application. The use state storage 106 stores a communication profile under use, for example, as a flag and thereby stores a use state. In addition, combination 2 indicates that it is possible to simultaneously use a music application and a terminal management application. These combinations are defined by a manufacturer of mobile equipment so as to avoid simultaneous use of applications causing duplication of wireless communication frequencies. This table can be updated, for example, by an update of firmware of mobile equipment by Air Download. Besides these pieces of information, the maximum number of communication connections for the short-range wireless communication may also be stored as a threshold. The short-range wireless communication management unit 104 may also be configured to determine the availability of short-range wireless communication from external application 102, based on this maximum number of communication connections.

The use state storage 106 is a part that stores the communication profiles and total number of communication connections used by applications currently under the short-range wireless communication, when an instruction to execute the short-range wireless communication is given by the short-range wireless communication management unit 104. For example, where a music application being the native application 103 is activated, the short-range wireless communication management unit 104 lets the use state storage 106 store the communication profile used by the music application, and lets the use state storage 106 store a flag in the same table as in the communication profile storage 105. When the maximum number of communication connections is stored as a threshold in the use state storage 106, the total number of communication connections is incremented by one.

The connection unit 107 is a part that outputs an instruction to instruct the short-range wireless communication unit 110 to execute a communication process, when receiving a communication instruction from the short-range wireless communication management unit 104. When the connection unit 107 fails to perform the connection process, it notifies the external application 102 or native application 103 of the fact and makes the display unit 109 display it.

The disconnection unit 108 is a part that outputs an instruction to instruct the display unit 109 to inform the user of a disconnection instruction, when receiving the disconnection instruction from the short-range wireless communication management unit 104. Thereafter, if a disconnection instruction is given by a user's operation, the disconnection unit 108 outputs an instruction to instruct the short-range wireless communication unit 110 to execute a disconnection process of communication. When the disconnection unit 108 fails to perform the disconnection process, it notifies the external application 102 of the fact via the short-range wireless communication management unit 104 or directly.

The disconnection unit 108 is preferably installed as an API (Application Programming Interface) in the mobile equipment 100. This disconnection unit 108 performs the disconnection process of short-range wireless communication in accordance with a disconnection instruction from the external application 102 and notifies the external application 102 of the result thereof.

The display unit 109 is a part that displays information indicating active applications (e.g., names of applications or the like) in order to let the user determine which application should be disconnected, prior to execution of the disconnection instruction by the disconnection unit 108, and is provided with an operation button for user's selection. The user uses this operation button to instruct a confirmation request for short-range wireless communication and can make the short-range wireless communication management unit 104 determine the availability of connection of short-range wireless communication.

The short-range wireless communication unit 110 is a part that executes a communication process by the short-range wireless communication (e.g., Bluetooth communication), and can perform the short-range wireless communication with portable information processing terminal 300, speaker system 301, or hands-free call device 302 in accordance with an instruction from external application 102 or native application 103.

The wireless communication unit 111 is a part that performs wireless communication with base station 201 to make a communication connection to a public mobile communication network, and this wireless communication unit 111 can communicate with server 200 through the public mobile communication network. The external application 102 can receive an activation instruction through this wireless communication unit 111, become activated, and execute the short-range wireless communication.

As the mobile equipment 100 is configured as described above, it can prevent simultaneous execution of applications causing duplication of wireless communication frequencies, and avoid inconsistency between the process state instructed by the application and the actual state due to shortage of wireless communication resources. It can also prevent disconnection of wireless communication before the user is informed.

Figure 5:
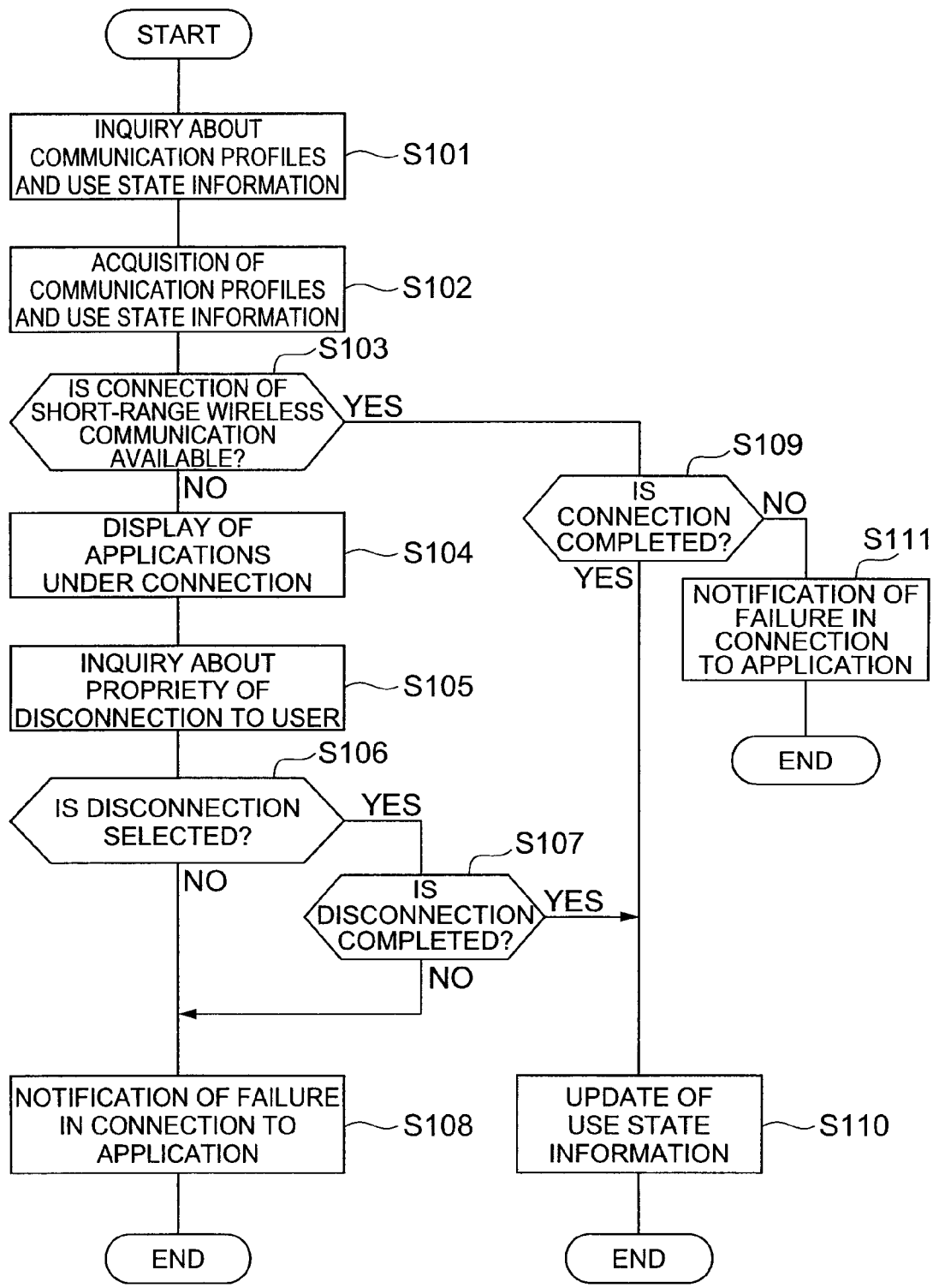
FIG. 5 is a flowchart showing an operation of mobile equipment 100 executed when an external application 102 requests short-range wireless communication.

Next, the operation of mobile equipment 100 will be described. FIG. 5 is a flowchart showing an operation executed when the external application 102 of mobile equipment 100 sends a request for the short-range wireless communication to the short-range wireless communication unit 110. This operation is based on the presumption that, for example, while a music application is in the short-range wireless communication, the server 200 performs a control to access mobile equipment 100 at regular or irregular intervals to activate the external application 102. For example, this operation is processing executed where the server 200 is a delivery management server and tries to acquire a delivery record through mobile equipment 100 from portable information processing terminal 300 storing the delivery record. Without having to be limited to this, it is also possible to adopt a configuration wherein the external application 102 requests the short-range wireless communication in accordance with a user's operation.

First, the external application 102 is activated to instruct the short-range wireless communication unit 110 to perform the short-range wireless communication (short-range wireless communication step). Then the short-range wireless communication management unit 104 detects this instruction. Then this short-range wireless communication management unit 104 performs an inquiry process to inquire about the communication profiles stored in the communication profile storage 105 and the use state information stored in the use state storage 106 (S101), and then acquires the communication profiles and use state information (S102). Then the short-range wireless communication management unit 104 determines whether the short-range wireless communication by the short-range wireless communication unit 110 is available (S103: determination step).

When it is determined herein that the short-range wireless communication is unavailable, applications under connection are displayed on the display unit 109 (S104) and the user is inquired as to whether the short-range wireless communication should be disconnected (S105). Then the disconnection unit 108 determines whether the user selected disconnection (S106). When the disconnection unit 108 selects a disconnection process, the disconnection unit 108 then determines whether the disconnection process based on the user's disconnection selection is completed (S107). When the disconnection process is completed, the flow goes to S110 to perform an update process of the use state information stored in the use state storage 106 (S110).

When the disconnection process is not completed, for example, when it is preliminarily defined that the disconnection process halfway is not accepted depending upon a type of the application, the flow goes to S108, without completion of the disconnection process. When in S106 the user does not select the disconnection of short-range wireless communication already executed by native application 103, or when in S107 the disconnection of short-range wireless communication already executed is not completed, the wireless communication is not executed because the short-range wireless communication by external application 102 is duplicately carried out. Then the disconnection unit 108 notifies the external application 102 of the failure in connection and the result is displayed on the display unit 109 to inform the user thereof (S108: notification step). The external application 102, receiving this notification, recognizes the failure in the connection to the portable information processing terminal 300 and notifies the server 200 of the failure in connection according to need, using the wireless communication unit 111.

When in S103 the short-range wireless communication management unit 104 determines that the connection of short-range wireless communication by the short-range wireless communication unit 110 is available (S103), it is determined whether the connection unit 107 succeeded in the communication connection by the short-range wireless communication unit 110 (S109). When it is determined that the connection of short-range wireless communication was successful, the short-range wireless communication management unit 104 updates the use state information stored in the use state storage 106 (S110). When it is determined that the communication connection was unsuccessful, the external application 102 is notified that the communication connection by short-range wireless communication unit 110 was unsuccessful, and the fact is displayed on the display unit 109 (S111).

As the mobile equipment 100 operates in this manner, even if the connection was unsuccessful by the short-range wireless communication to the portable information processing terminal 300, the external application 102 can recognize the fact. Then it can notify the server 200 of the fact through the use of the wireless communication unit 111 and thus no difference occurs in acquisition of information between server 200 and external application 102. Namely, the following misjudgment can be prevented: the server 200 sends an information acquisition request to the mobile equipment 100, a timeout occurs without acquisition of information because of the absence of the wireless communication resource in the mobile equipment 100, and the server 200 determines that there is no information (e.g., no delivery record) to be sent, in the portable information processing terminal 300. The system is configured so that the external application 102 connects with server 200, but, without having to be limited to this, the above-described processing may be so arranged that the native application 103 establishes a communication connection with the portable information processing terminal 300 and notifies the server 200 of the result of the connection.

The above-described processing is configured to perform the connection of short-range wireless communication by external application 102 or the disconnection thereof, but the processing can also be configured so that only the notification to external application 102 is performed without execution of this short-range wireless communication connection. For example, the processing may be arranged as follows: when the server 200 is a delivery management server and is about to acquire through mobile equipment 100 from the portable information processing terminal 300 storing a delivery record, the delivery record, the server first confirms whether the short-range wireless communication by external application 102 is available. It is also possible to arrange the processing so that the external application 102 makes a confirmation request for short-range wireless communication in accordance with a user's operation.

Figure 6:
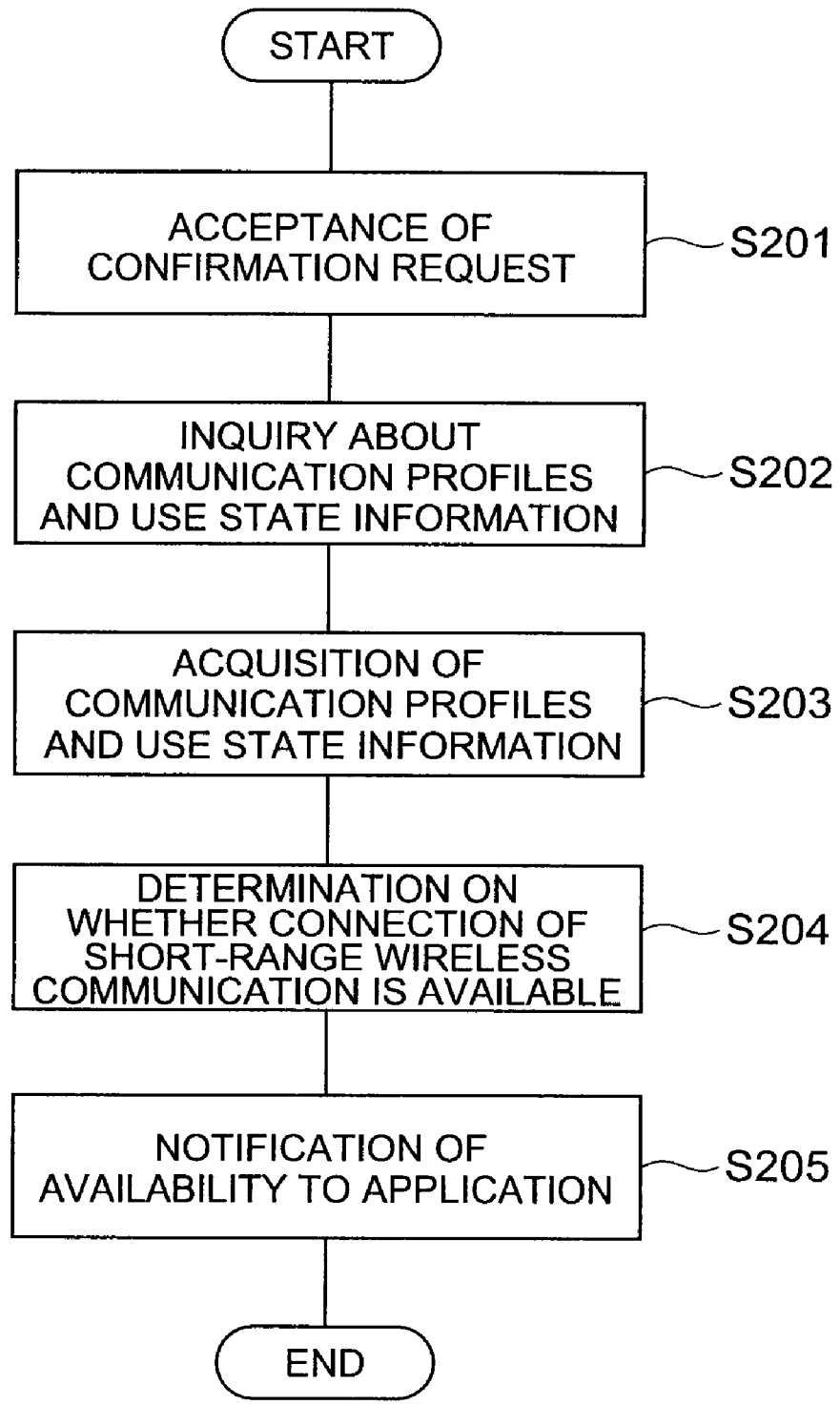
FIG. 6 is a flowchart showing an operation of mobile equipment 100 executed when a confirmation request is made in use of short-range wireless communication.

FIG. 6 is a flowchart showing an operation of mobile equipment 100 executed when a confirmation request is made in use of short-range wireless communication. First, the external application 102 accepts a confirmation request for confirming whether the short-range wireless communication by external application 102 can be executed (S201). For example, the confirmation request is transmitted from the server 200 or the user manipulates the external application 102, whereby the external application 102 accepts the confirmation request. When the external application 102 accepts the confirmation request, the short-range wireless communication management unit 104 makes an inquiry about the communication profiles and the use state information (S202). In response to this inquiry, the short-range wireless communication management unit 104 acquires the communication profiles and use state information (S203).

The short-range wireless communication management unit 104 determines whether the connection of short-range wireless communication by external application 102 as a target of the foregoing confirmation request is available, based on the acquired communication profiles and use state information (S204). Then the external application 102 is notified of the result of the determination herein and the result is also displayed on the display unit 109 to inform the user (S205).

As the external application 102 receives this notification, it can confirm whether the short-range wireless communication by the external application 102 is available. In the case where the external application 102 made the confirmation request in accordance with an instruction from server 200, the server 200 may be notified of whether the short-range wireless communication by external application 102 is available. This notification permits the server 200 to determine whether the external application 102 is able to acquire information by the short-range wireless communication, and this eliminates a recognition gap of processing contents between server 200 and the external application.

Figure 7:
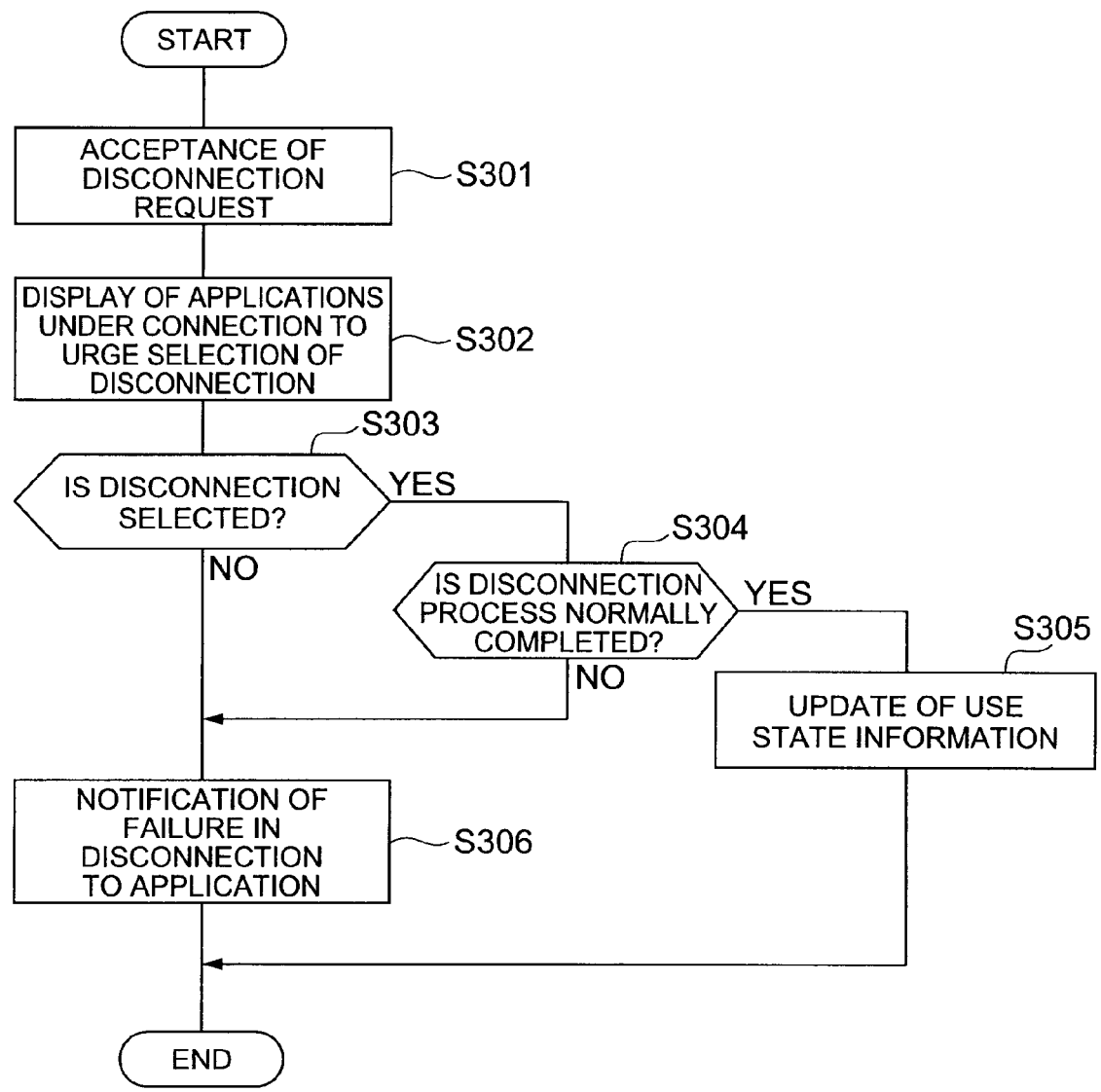
FIG. 7 is a flowchart showing an operation of mobile equipment 100 executed when an external application 102 sends a disconnection request to disconnect a communication connection.

The following will describe an operation executed when the external application 102 makes a disconnection request to disconnect a communication connection of short-range wireless communication by native application 103. FIG. 7 is a flowchart showing the operation of mobile equipment 100 executed when the external application 102 makes a disconnection request to disconnect a communication connection of short-range wireless communication by native application 103.

First, the external application 102 accepts a disconnection request of short-range wireless communication by native application 103 (S301). This acceptance may be implemented based on a user's operation on the external application 102 or based on an instruction sent from the server 200, or may be automatically carried out by the external application 102. The significance of the transmission from server 200 or the automatic execution is that the user is regularly encouraged to disconnect use of the short-range wireless communication and if the short-range wireless communication is executed by a malfunction, the user can be notified of the fact at an early stage.

Next, applications under connection are displayed on the display unit 109 in accordance with the disconnection request, and the user is made to select an application to be disconnected (S302). Then the disconnection unit 108 determines whether the user selected a disconnection of native application 103 (S303). When it is determined herein that the user selected the disconnection, it is determined whether the disconnection process was normally performed (S304). Specifically, when a predetermined setting is such that the disconnection of wireless communication is inhibited during communication of native application 103, the disconnection process is not normally carried out. The mobile equipment may also be configured so that a native application with the setting to inhibit the disconnection of wireless communication is not displayed as an application to be disconnected, on the display unit 109. This configuration can prevent a native application without the setting to inhibit the disconnection of wireless communication and a native application with the setting to inhibit the disconnection of wireless communication from being displayed as mixed on the display unit 109, and prevent the user from selecting the native application with the setting to inhibit the disconnection of wireless communication.

When the disconnection process is normally carried out in S304, a process of updating the use state information in the use state storage 106 is carried out (S305). When the disconnection process is not performed in S304, or when disconnection is not selected in S303, the external application 102 is notified of the failure in disconnection (S306). The processing may be configured so that the user is notified of the failure.

When the external application 102 implements the disconnection of short-range wireless communication by native application 103 in this manner, it is feasible to avoid such a complicated work as disconnection of short-range wireless communication based on a malfunction, or an operation of once terminating the external application 102, then terminating the native application 103 and disconnecting the short-range wireless communication thereof, and again activating the external application 102 to make the short-range wireless communication available.

The below will describe the action and effect of mobile equipment 100 of the present embodiment. The mobile equipment 100 of the present embodiment is configured so that the communication profile storage 105 stores the table in which the combinations of communication profiles available for simultaneous execution of short-range wireless communication are described and the use state storage 106 stores the current use state of short-range wireless communication. When the mobile equipment 100 has, for example, an instruction of a connection or confirmation of short-range wireless communication from external application 102, the short-range wireless communication management unit 104 is able to determine whether the short-range wireless communication by application 102 is available, based on the communication profiles. When it is determined that the short-range wireless communication by external application 102 is not available, one application is notified that the short-range wireless communication is unavailable.

This can avoid the situation in which one application gives an instruction of a connection of short-range wireless communication but fails to establish the connection of short-range wireless communication, avoid the inconsistency between the state instructed by the application and the actual state, and improve convenience of the downloaded application such as i-Appli and ease of programming appendant to the state management. The same processing can be performed in the confirmation process to confirm whether a connection is possible, whereby when the connection is impossible, the fact can be notified of; it can also avoid the inconsistency between the state instructed by the application and the actual state.

The mobile equipment 100 is able to determine whether the short-range wireless communication by one application is available, based on the number of connections by short-range wireless communication stored in the communication profile storage 105. This allows the equipment to perform the communication management, not only based on the communication profiles such as wireless communication resources, but also based on the number of connections, whereby it is feasible to avoid a situation in which an application fails to operate due to increase in the number of connections, and to avoid the inconsistency between the state instructed by the application and the actual state more reliably.

The external application 102 in mobile equipment 100 is able to accept an instruction of activation through the network and if the communication connection by short-range wireless communication is unavailable, it is able to notify that the connection is unavailable, to the network through the use of the wireless communication unit 111. This permits the network to be also notified of the communication state of short-range wireless communication of external application 102 and can avoid the inconsistency between the state instructed on the network side and the actual state.

The mobile equipment 100 is configured to display on the display unit 109 that the short-range wireless communication by external application 102 currently under short-range wireless communication should be disconnected, whereby the user can be informed of the fact, and the short-range wireless communication can be disconnected in accordance with a user's permission.

The mobile equipment 100 is able to display applications under connection on the display unit 109 in response to a disconnection request and to disconnect a connection of an application selected from external application 102 and native application 103 displayed on the display unit 109, whereby the short-range wireless communication connection due to a malfunction or the like can be disconnected.

The mobile equipment 100 is configured so that when the disconnection unit 108 disconnects the external application 102 because of shortage of wireless communication resources, the wireless communication connection by short-range wireless communication unit 110 can be executed in another application different from the external application 102. This permits the wireless communication connection to be executed in another application different from the external application 102 and the function of external application 102 can be substantially implemented, thus providing the wireless communication function easier for the user to use.

In the mobile equipment 100 the external application 102 can make an inquiry about the availability of short-range wireless communication, using the API (Application Programming Interface), which can facilitate the control of connection by short-range wireless communication.

In the mobile equipment 100 the external application 102 can perform the disconnection of short-range wireless communication, using the API (Application Programming Interface), which can facilitate the control of disconnection by short-range wireless communication.

What is claimed is:

1. A wireless communication apparatus comprising:
    a plurality of applications;
    wireless communication unit for performing short-range wireless communication, based on instructions from the applications;
    storage unit for storing a table in which combinations of communication profiles allowing simultaneous communication for each of the applications are described, and a current use state of execution of the short-range wireless communication;
    determining unit for, with an instruction from one application, determining whether the short-range wireless communication is available for the one application, based on the combinations of communication profiles described in the table stored in the storage unit and the current use state of the short-range wireless communication; and
    notifying unit for notifying said one application that the short-range wireless communication is unavailable, when the determining unit determines that the short-range wireless communication is not available for the one application.

2. The wireless communication apparatus according to claim 1,
    wherein the storage unit stores a total number of communication connections by the short-range wireless communication, as a communication profile, and
    wherein the determining unit determines whether the short-range wireless communication is available for the one application, based on the number of connections by the wireless communication.

3. The wireless communication apparatus according to claim 1, wherein said one application receives an instruction of activation through a network.

4. The wireless communication apparatus according to claim 3, wherein when any communication connection by the short-range wireless communication is not available, a notification of unavailability of connection is sent to the network.

5. The wireless communication apparatus according to claim 1, further comprising informing unit for informing a user that the short-range wireless communication by an application currently under the short-range wireless communication should be disconnected.

6. The wireless communication apparatus according to claim 1, further comprising:
    display unit for displaying applications under connection in accordance with a disconnection request; and
    disconnecting unit for disconnecting a connection of an application selected from the applications displayed by the display unit.

7. The wireless communication apparatus according to claim 6, further comprising:
    connection switch unit for executing a wireless communication connection by the short-range wireless communication unit in another application different from the one application, after disconnection by the disconnecting unit.

8. The wireless communication apparatus according to claim 6,
- wherein when a user selects a disconnection, the one application gives an instruction to instruct the disconnecting unit to perform the disconnection, using an application programming interface, and
- wherein with the instruction, the disconnecting unit disconnects the connection based on the short-range wireless communication by the one application.

9. The wireless communication apparatus according to claim 6, wherein the disconnecting unit does not execute a disconnection of the short-range wireless communication by an application for which a setting to inhibit the disconnection of wireless communication during the communication is preliminarily configured.

10. The wireless communication apparatus according to claim 6, wherein the display unit does not display an application for which a setting to inhibit a disconnection of wireless communication during the communication is preliminarily configured.

11. The wireless communication apparatus according to claim 1,
- wherein said one application sends to the determining unit an inquiry about whether the short-range wireless communication is available, using an application programming interface, and
- wherein with the inquiry, the determining unit determines whether the short-range wireless communication by the one application is available.

12. A wireless communication apparatus comprising:
- a plurality of applications;
- wireless communication unit for performing short-range wireless communication, based on instructions from the applications;
- storage unit for storing a table in which combinations of communication profiles allowing simultaneous communication for each of the applications are described, and a current use state of execution of the short-range wireless communication; and
- determining unit for, with an instruction from one application, determining whether the short-range wireless communication is available for the one application, based on the combinations of communication profiles described in the table stored in the storage unit and the current use state of the short-range wireless communication;
- wherein the storage unit stores application correlation information to indicate a correlation between one application and an application functionally similar to said one application, and
- wherein when the determining unit determines that the short-range wireless communication is unavailable for the one application, the application functionally similar to the one application is activated using the application correlation information stored in the storage unit.

13. A wireless communication method of a wireless communication apparatus capable of executing a plurality of applications, the wireless communication method comprising:
- a wireless communication step of performing short-range wireless communication, based on instructions from the applications;
- a determination step of, with an instruction from one application, determining whether the short-range wireless communication is available for said one application, based on combinations of communication profiles allowing simultaneous use for each of the applications, which are preliminarily stored in a table, and a current use state of the short-range wireless communication; and
- a notification step of notifying the one application that the short-range wireless communication is unavailable, when it is determined in the determination step that the short-range wireless communication is not available for the one application.

* * * * *